(12) United States Patent
Ocher et al.

(10) Patent No.: US 11,734,295 B2
(45) Date of Patent: *Aug. 22, 2023

(54) PARALLEL LOAD OPERATIONS FOR ETL WITH UNIFIED POST-PROCESSING

(71) Applicant: SAP SE, Walldorf (DE)

(72) Inventors: Alexander Ocher, San Jose, CA (US); Sreenivasulu Gelle, San Ramon, CA (US); Richard Joe, San Jose, CA (US); Karoly Daxkobler, Budapest (HU); Maicon Trasel Loebens, Sao Leopoldo (BR); Reinhard Sudmeier, Heidelberg (DE); Manali Pise, Sunnyvale, CA (US); Anil Samudrala, Newark, CA (US); Zoltan Hajnal, Budapest (HU); Yanlun Ma, Saratoga, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,282

(22) Filed: Jan. 26, 2022

(65) Prior Publication Data

US 2022/0147538 A1    May 12, 2022

Related U.S. Application Data

(63) Continuation of application No. 17/000,032, filed on Aug. 21, 2020, now Pat. No. 11,269,912.

(60) Provisional application No. 63/051,725, filed on Jul. 14, 2020.

(51) Int. Cl.
*G06F 17/00* (2019.01)
*G06F 16/25* (2019.01)
*G06F 16/23* (2019.01)
*G06F 16/28* (2019.01)
*G06F 9/54* (2006.01)

(52) U.S. Cl.
CPC ............ *G06F 16/254* (2019.01); *G06F 9/547* (2013.01); *G06F 16/2386* (2019.01); *G06F 16/256* (2019.01); *G06F 16/258* (2019.01); *G06F 16/283* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 9,436,746 B2    9/2016  Ocher
2004/0254948 A1*  12/2004 Yao ..................... G06F 16/254
(Continued)

OTHER PUBLICATIONS

"Extract, Transform, Load", retrieved from https://en.wikipedia.org/w/index.php?title=Extract_Transform,_Load&oldid=964605513 on Jul. 6, 2020, 9 pages.

(Continued)

*Primary Examiner* — Hung D Le
(74) *Attorney, Agent, or Firm* — Fountainhead Law Group P.C.

(57) ABSTRACT

A computer implemented system and method of performing parallel load operations during an extract, transform, load (ETL) operation. The system generates a single transaction having multiple processes, where each process loads into one target table. The processes are executed in parallel, and the system performs verification on the single transaction.

20 Claims, 7 Drawing Sheets

(56) References Cited

U.S. PATENT DOCUMENTS

| | | | |
|---|---|---|---|
| 2008/0172674 A1* | 7/2008 | Yee | G06F 16/254 |
| | | | 718/106 |
| 2008/0222634 A1* | 9/2008 | Rustagi | G06F 9/5038 |
| | | | 718/100 |
| 2011/0072319 A1* | 3/2011 | Agarwal | G06F 16/86 |
| | | | 714/49 |
| 2014/0032506 A1 | 1/2014 | Hoey et al. | |
| 2014/0214753 A1* | 7/2014 | Guerra | G06F 16/254 |
| | | | 707/602 |
| 2015/0100543 A1 | 4/2015 | Tsuchida et al. | |
| 2015/0169713 A1 | 6/2015 | Ocher | |
| 2015/0242477 A1* | 8/2015 | Bhide | G06F 16/283 |
| | | | 707/602 |
| 2016/0314176 A1* | 10/2016 | Dhayapule | H04L 47/125 |
| 2017/0032016 A1* | 2/2017 | Zinner | G06F 16/283 |
| 2019/0258736 A1 | 8/2019 | Ocher et al. | |
| 2019/0310992 A1* | 10/2019 | Ul Karimi | G06Q 10/103 |

OTHER PUBLICATIONS

Anonymous: "SAP: Designer Guide", SAP Data Services Document Version 4.2 Support Package 12, dated Sep. 3, 2019, pp. 1-1032. Retrieved from teh Internet: https://help.sap.com.

Anonymous: "SAP: Performance Optimization Guide", SAP Data Services Document Version 4.2 Support Package 12, dated Sep. 3, 2019, pp. 1-202. Retrieved from teh Internet: https://help.sap.com.

Extended European Search Report, for EP Application #21184582.1, dated Dec. 9, 2021, 9 pages.

Selmeci A et al. "SAP Remote Communications", Applied Computational Intelligence and Informatics (SACI), 2012 7th IEEE, May 24, 20112, pp. 303-309.

\* cited by examiner

| Scenario | Reported Status | Treat errors as success? | Result | Dataflow level post-processing | Transaction level post-processing |
|---|---|---|---|---|---|
| 1 | Processed | True | D | Continue | Continue |
| 2 | Processed | False | D | Continue | Continue |
| 3 | Processed with errors | True | RD | Continue | Continue |
| 4 | Processed with errors | False | E at dataflow level, RE at transaction level | Stop (status: E) | Continue (status: RE) |
| 5 | Error | True | E | Stop (rollback) | Stop (rollback) |
| 6 | Error | False | E | Stop (rollback) | Stop (rollback) |

PARALLEL LOAD OPERATIONS FOR ETL WITH UNIFIED POST-PROCESSING

CROSS REFERENCE TO RELATED APPLICATIONS

The present application is a continuation of U.S. application Ser. No. 17/000,032 for "Parallel Load Operations for ETL with Unified Post-Processing" filed Aug. 21, 2020, which claims the benefit of U.S. Provisional Application No. 63/051,725 for "Parallel Load Operations for ETL with Unified Post-Processing" filed Jul. 14, 2020, all of which are incorporated herein by reference.

BACKGROUND

The present invention relates to database systems, and in particular, to the extract, transform, load (ETL) procedure in analytics database systems.

Unless otherwise indicated herein, the approaches described in this section are not prior art to the claims in this application and are not admitted to be prior art by inclusion in this section.

Database systems come in various types, including online transaction processing (OLTP) systems, online analytic processing (OLAP) systems, etc. OLTP systems may be used to manage transactional data, including insertion operations, update operations, and delete operations on the transactional data. OLAP systems may be used for analysis of the transactional data; as such, the OLAP systems may perform read operations on a reduced set of the transactional data. For example, an OLTP system may process transactional data of purchase orders, including purchase order identifier, date, product identifier, purchaser identifier, price, discount, etc.; an OLAP system may process aggregations of the purchase order data, such as aggregations by date (e.g., within a given month), by product type, by purchaser, etc.

OLAP systems often use an extract, transform, load (ETL) process to import transactional data managed by OLTP systems. Extraction generally refers to the selection of a subset of the transactional data. Transformation generally refers to applying a set of rules or functions to the extracted data in order to conform to the expected input to the OLAP system. Loading generally refers to the process of providing the transformed data from the OLTP system to the OLAP system.

SUMMARY

Given the above, a number of issues are presented. One issue with existing systems is that customers often want to perform analysis of the transactions from multiple, heterogeneous OLTP systems (or OLTP systems that store the transactional data using heterogeneous cloud storage systems). Each OLTP system, or each cloud storage system, generally involves its own ETL operation. In such a case, it is cumbersome to coordinate each ETL operation and to verify the success of each ETL operation. For example, when there is a need to load data into a cloud database and perform post processing after the load, many existing systems use a separate process for each table (e.g., loading data and post-processing each table as a table-specific transaction). This leads to lack of transaction control, when there is a need to load and post-process different types of data as one transaction. An attempt to load/post-process data in multiple tables using the same process and a single transaction leads to poor system performance due to serial execution.

There is a need to improve the ETL process in this situation.

As further described herein, embodiments are directed to performing ETL from multiple, heterogeneous OLTP systems. In general, embodiments create an overall ETL process as a single transaction, and generate multiple operating system (OS) processes within the single transaction. Each OS process corresponds to an ETL operation having a single target table. The overall ETL process may execute the OS processes in parallel. Once the OS processes have completed, the overall ETL process verifies the success of each OS process.

In one embodiment, a method performs data processing. The method includes generating, by an ETL system, a single target system transaction having a single transaction identifier as part of performing an ETL operation. The method further includes generating, by the ETL system, a plurality of OS processes, wherein the plurality of OS processes corresponds to a plurality of load operations of the ETL operation, wherein each of the plurality of load operations is associated with one target table of a plurality of target tables. The method further includes executing in parallel, by the ETL system, the plurality of OS processes, wherein each of the plurality of OS processes is associated with the single transaction identifier, including communicating, by the ETL system to an OLAP system, configuration information for each of the plurality of load operations. The method further includes loading, by the OLAP system, each of the plurality of target tables according to the configuration information for each of the plurality of load operations as a part of the single target system transaction in the OLAP system. The method further includes communicating, by the OLAP system to the ETL system, a plurality of results of loading the plurality of target tables. The method further includes performing verification, by the ETL system, of the single target system transaction using the plurality of results from the OLAP system.

The plurality of tables may be stored by a plurality of heterogeneous cloud data storage systems. The ETL system may communicate the configuration information to the OLAP system using a plurality of remote system calls, wherein each of the plurality of remote system calls corresponds to one of the plurality of OS processes, to one of the plurality of load operations, and to one target table of the plurality of target tables. The ETL system may divide the load operation into batches. The ETL system may perform verification at a transaction level or at a dataflow level. The transaction may be implemented as a number of dataflows, at least some of which may be executed in parallel and at least some of which may be executed sequentially. The OLAP system may include an in-memory database system.

A computer readable medium may store a computer program for controlling a computer to implement one or more steps of the above methods.

A system may implement one or more steps of the above methods, using one or more computer systems (e.g., a server computer, a database system, a client computer, etc.) to perform one or more of the method steps.

The following detailed description and accompanying drawings provide a better understanding of the nature and advantages of the present invention.

BRIEF DESCRIPTION OF THE DRAWINGS

FIG. 4 is a table 400 showing six different post-processing scenarios, according to an embodiment.

DETAILED DESCRIPTION

Figure 1:
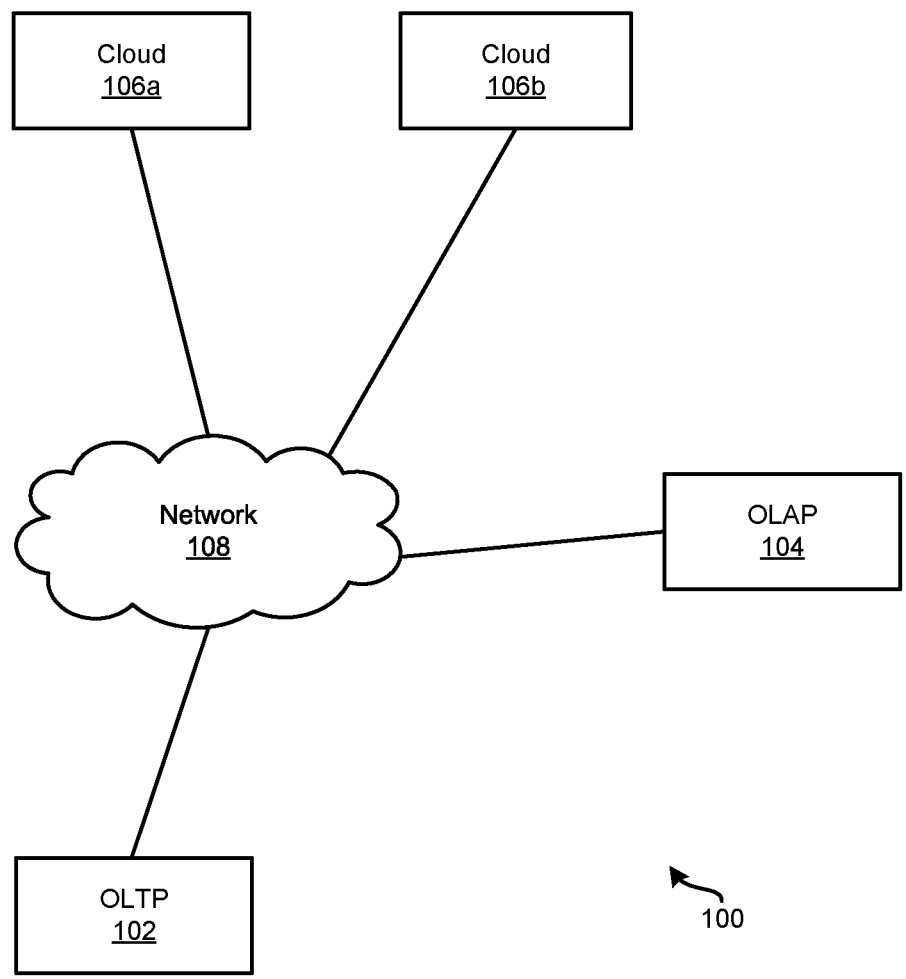
FIG. 1 is a block diagram of a database environment 100.

Described herein are techniques for parallel load operations. In the following description, for purposes of explanation, numerous examples and specific details are set forth in order to provide a thorough understanding of the systems and methods described herein. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

In this document, the term "server" is used. In general, a server is a hardware device, and the descriptor "hardware" may be omitted in the discussion of a hardware server. A server may implement or execute a computer program that controls the functionality of the server. Such a computer program may also be referred to functionally as a server, or be described as implementing a server function; however, it is to be understood that the computer program implementing server functionality or controlling the hardware server is more precisely referred to as a "software server", a "server component", or a "server computer program".

In this document, the term "database" is used. In general, a database is a data structure to organize, store, and retrieve large amounts of data easily. A database may also be referred to as a data store. The term database is generally used to refer to a relational database, in which data is stored in the form of tables and the relationship among the data is also stored in the form of tables. A database management system (DBMS) generally refers to a hardware computer system (e.g., persistent memory such as a disk drive or flash drive, volatile memory such as random access memory, a processor, etc.) that implements a database.

In this document, the terms "to store", "stored" and "storing" are used. In general, these terms may be used to refer to an active verb (e.g., the process of storing, or changing from an un-stored state to a stored state), to a state of being (e.g., the state of being stored), or both. For example, "storing a data record" may be used to describe the process of storing (e.g., the data record transitioning from the un-stored state to the stored state). As another example, "storing a data record" may be used to describe the current state of a data record (e.g., the data record currently exists in the stored state as a result of being previously stored). When only a single interpretation is meant, such meaning will be apparent from the context.

FIG. 1 is a block diagram of a database environment 100. The database environment 100 illustrates a typical arrangement of the computer systems that implement the embodiments described herein. An example of the database environment 100 is the SAP Cloud Platform from SAP SE. The database environment 100 includes an online transaction processing (OLTP) system 102, an online analytic processing (OLAP) system 104, a plurality of cloud storage systems 106 (two shown, 106a and 106b), and a network 108.

The OLTP system 102 generally processes transactional data. Examples of OLTP systems include systems for order entry, retail sales, financial transaction systems, etc. OLTP processing generally involves gathering input information, processing the data and updating existing data to reflect the collected and processed information. The OLTP system 102 may be implemented by a database system, for example a relational database system. The database system may be a row-oriented database system, a column-oriented database system, etc. An example of the OLTP system 102 is the SAP S/4HANA™ enterprise resource planning (ERP) system.

The OLAP system 104 generally processes analytic data. Typical applications of OLAP systems include business reporting for sales, marketing, management reporting, business process management (BPM), budgeting and forecasting, financial reporting, etc. OLAP consists of three basic analytical operations: consolidation (roll-up), drill-down, and slicing and dicing. Consolidation involves the aggregation of data that can be accumulated and computed in one or more dimensions. Drill-down is a technique that allows users to navigate through the details. Slicing and dicing is a feature whereby users can take out (slicing) a specific set of data of the OLAP cube and view (dicing) the slices from different viewpoints. These viewpoints are sometimes called dimensions (such as looking at the same sales by salesperson, or by date, or by customer, or by product, or by region, etc.). An example of the OLAP system 104 is the SAP BW/4HANA™ data warehouse solution.

The cloud storage systems 106 generally store the data processed by the OLTP system 102 and the OLAP system 104. Examples of the cloud storage systems 106 include SAP™ data centers, Microsoft Azure™ data centers, Amazon Web Services™ data centers, Alibaba Cloud™ data centers, Google Cloud Platform™ data centers, etc.

The network 108 generally connects the components of the database environment 100. An example of the network 108 is the internet.

According to an embodiment, a customer accesses the database environment 100 (including the OLTP system 102, the OLAP system 104 and the cloud storage systems 106) via a software as a service (SaaS), platform as a service (PaaS) or infrastructure as a service (IaaS) arrangement. In such a case, these systems may provide service to a number of customers.

The database environment 100 may include other systems that (for brevity) are not shown. For example, a user may interact with the OLTP system 102 or the OLAP system 104 via an end user device such as a personal computer, a mobile device, etc. that connects via the network 108. As another example, a customer may have an on-premises database system that processes transactional data and that connects to the OLAP system 104 via the network 108, and may store the transactional data locally, on the cloud storage systems 106, etc.

An example use case of the database environment 100 is that the customer is a parent company with two subsidiary companies; one subsidiary accesses the cloud storage system 106a and the other subsidiary accesses the cloud storage system 106b. In such a case, coordinating the ETL process into the OLAP system 104 is complex, and the embodiments described in more detail herein provide improvements over existing methods.

Figure 2:
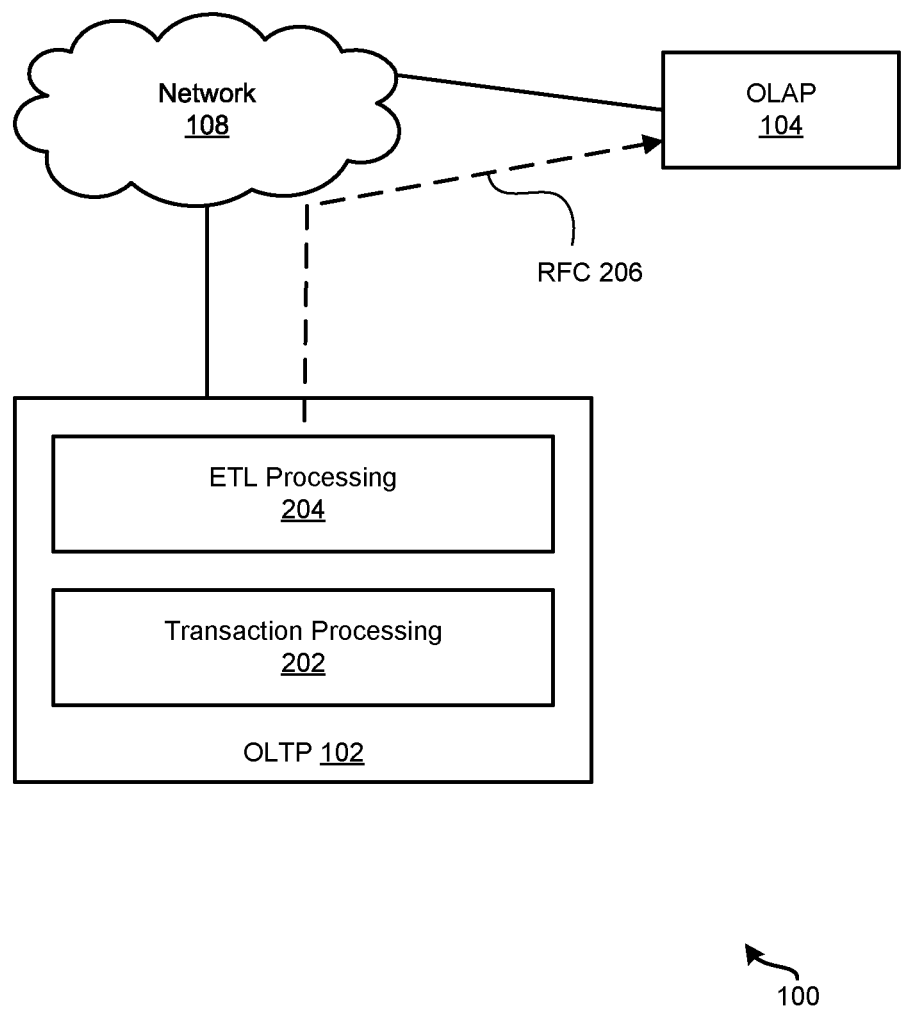
FIG. 2 is a block diagram showing additional details of the database environment 100.

FIG. 2 is a block diagram showing additional details of the database environment 100 (see FIG. 1). The database environment 100 includes a transaction processing system 202 and an ETL processing system 204. These components are shown as components of the OLTP system 102. The OLTP system 102 may include other components that (for brevity) are not described in detail. Alternatively, the ETL processing system 204 may be located in a system separate from the OLTP system 102.

The transaction processing system 202 generally performs transaction processing. Transaction processing generally includes insert, update, delete, read and query operations on data. The transaction processing system 202 may implement a row-oriented DBMS, a column-oriented DBMS, etc. The transaction processing system 202 may interact with one or more storage devices to store the transactional data. These storage devices may be cloud storage devices (e.g., the cloud storage devices 106 of FIG. 1) accessed via the internet, local storage devices accessed via a local area network (LAN), etc.

The ETL processing system 204 generally coordinates the extract, transform and load operations relating to the transactional data processed by the transaction processing system 202, to result in the analytic data processed by the OLAP system 104. In an extract operation, a subset of the transactional data is selected. For example, transactional data of purchase orders may include purchase order identifier, date, product identifier, purchaser identifier, price, discount, etc. and the subset may be the purchase order data within a given date range (e.g., 1 day).

In a transform operation, the extracted data is transformed according to a defined operation. For example, the purchase order data may include prices in various currencies (e.g., Euros, Canadian dollars, etc.), and the transform operation may apply an exchange rate to the given currency price to convert it into a single currency price (e.g., U.S. dollars), for each extracted record.

In a load operation, the transformed data is loaded into the OLAP system 104. As shown in FIG. 2, the ETL processing system 204 uses remote system calls (also referred to as remote function calls, RFCs) 206 to coordinate the load with the OLAP system 104. For example, the ETL processing system 204 uses a RFC 206 to obtain configuration information, such as remote function names, from the OLAP system 104.

More specifically, the process of transferring data in the load operation includes five general steps. First, the ETL processing system 204 generates a transaction identifier. Second, the ETL processing system 204 performs a handshake with the OLAP system 104. Third, the ETL processing system 204 writes the transformed data to one or more staging tables in packages. (The staging tables may be stored by the cloud storage systems 106.) Fourth, the ETL processing system 204 triggers post-processing by the OLAP system 104. Fifth, the ETL processing system 204 checks the post-processing status of each load (or each batch of a load) in a loop.

As a specific example, to perform the handshake, the ETL processing system 204 calls a handshake function on the OLAP system 104, with operation name "write", a requested version number, an identifier for the task, the name of the task, etc. The handshake/versioning function returns the list of function modules for the steps in the given version of the process. For example, a given version may have three steps (three function names): A function to write data, a function to schedule post-processing, and a function to check the post-processing status. These functions are then called in subsequent steps to perform their corresponding operations.

In this manner, the ETL processing system 204 extracts a subset of transactional data from the transactional database tables (e.g., stored by the cloud storage systems 106), applies transformations, and sends data (the transformed transactional data and configuration information) to be loaded to the OLAP system 104 using RFCs. As discussed in more detail below, the ETL processing system 204 generates a single transaction identifier for the ETL process. The ETL processing system 204 also stores the configuration information that defines the operations to be performed in each ETL process. The ETL processing system 204 may trigger each transaction manually (e.g., according to user interaction) or automatically (e.g., according to a scheduler).

The OLAP system 104 receives the data from the ETL processing system 204 (e.g., via the RFC 206), and performs loading and post-processing of the data using the unique transaction identifier received as a part of the load (e.g., in the configuration information). The RFC performing the load contains both the business data (e.g., the transformed transactional data such as purchase order data, etc.) and control data (e.g., the transaction identifier, the target tables, package numbers, etc.). The OLAP system 104 then communicates the results of the load back to the ETL processing system 204, as further detailed below. The configuration information is sent in both directions: The OLAP system 104 sends function names for the load operation to the ETL processing system 204 in response to a RFC 206; and the ETL processing system 204 sends the business data and the configuration information (e.g., transaction identifier, target table, etc.) to the OLAP system 104 using another RFC 206, to perform the loading and post-processing.

As an example, the transaction processing system 202 performs transaction processing on purchase order data; the purchase order data is stored by the cloud storage 106a (see FIG. 1). At the end of the day, the ETL processing system 204 executes a project (as discussed in more detail below) to perform an ETL operation on the purchase order data, including the extract, transform and load operations discussed above. The ETL processing system 204 uses a RFC 206 to configure the OLAP system 104 to perform the load operation. The RFC 206 includes configuration information for the load operation, such as the transaction identifier, the target table stored by one of the cloud storage systems 106, etc. The OLAP system 104 performs the load operation and reports the results of the load operation to the ETL processing system 204.

Figure 3:
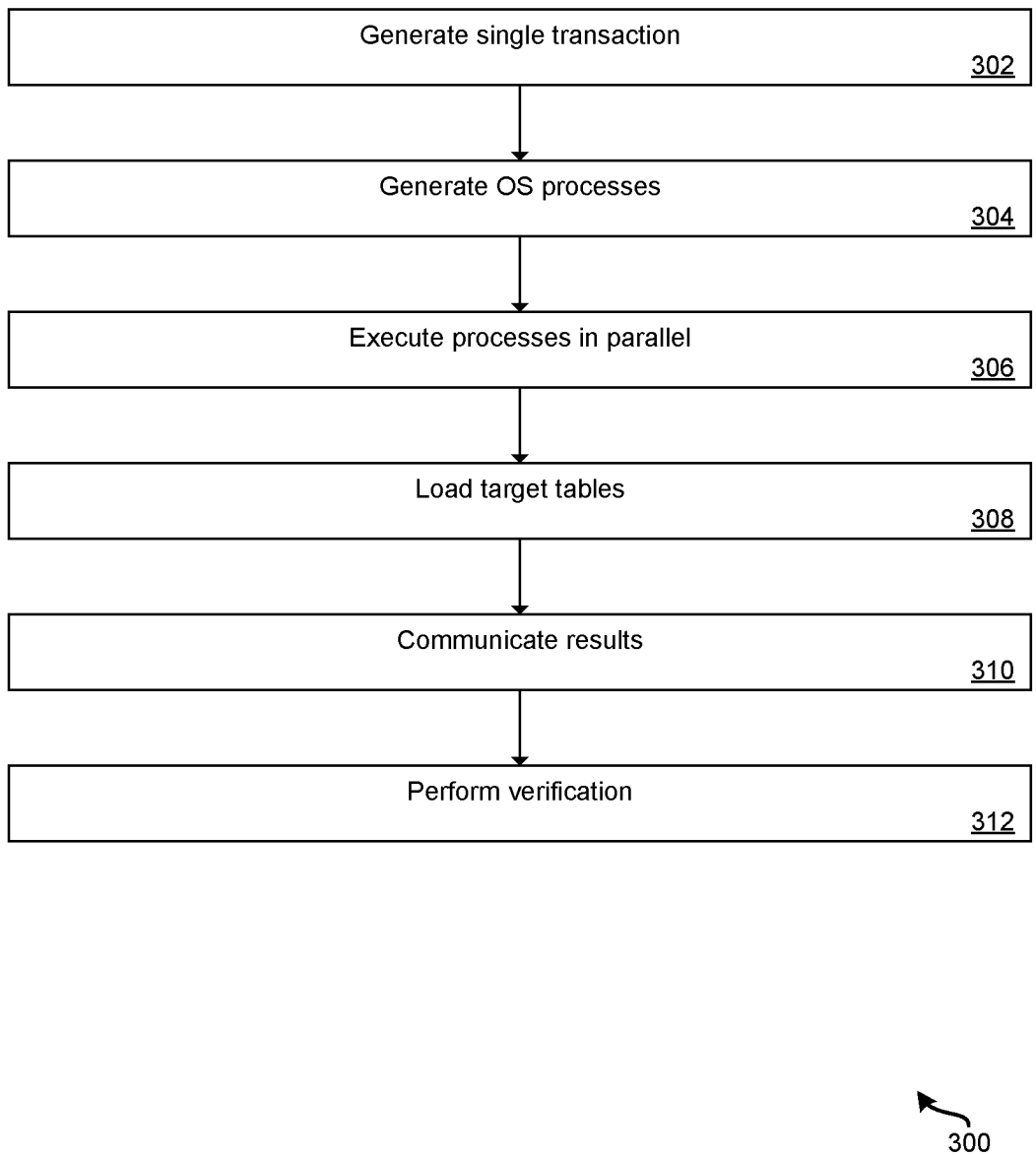
FIG. 3 is a flow diagram of a method 300 of data processing.

FIG. 3 is a flow diagram of a method 300 of data processing. The method 300 generally describes an ETL process, for example as implemented by the systems in the database environment 100 (see FIG. 1) by executing one or more computer programs.

At 302, a single transaction having a single transaction identifier is generated as part of performing an extract, transform, load (ETL) operation. The single transaction refers to a single target system transaction to be used by a target system. For example, the ETL processing system 204 (see FIG. 2) may generate the single transaction identifier for a given ETL operation to be used by the OLAP system 104 as part of an overall transaction.

At 304, a plurality of operating system (OS) processes are generated. The plurality of OS processes corresponds to a plurality of load operations of the ETL operation, and each of the plurality of load operations is associated with one target table of a plurality of target tables. For example, the ETL processing system 204 may execute the transaction for the ETL operation (see 302) as a collection of dataflows that are performed by the OS processes. The dataflows are described in more detail below.

At 306, the plurality of OS processes are executed in parallel. (The plurality of OS processes may also include processes that are executed sequentially, as discussed in more detail below.) Each of the plurality of OS processes is associated with the single transaction identifier, and includes communicating configuration information for each of the plurality of load operations to the OLAP system. For example, the ETL processing system 204 may execute the OS processes in parallel to perform each of the dataflows. The ETL processing system 204 communicates the configuration information to the OLAP system 104 using remote system calls, as described in more detail below.

At 308, each of the plurality of target tables is loaded according to the configuration information for each of the plurality of load operations, as a part of the single target system transaction in the OLAP system. For example, the OLAP system 104 uses the configuration information to perform loads into the target tables. Because each load operation corresponds to a remote system call (see 306) and each target table is separate, the OLAP system 104 may perform the load operations in parallel in accordance with the execution of the OS processes in parallel (see 306).

At 310, a plurality of results of loading the plurality of target tables are communicated. For example, the OLAP system 104 may communicate to the ETL processing system 204 a result for each load operation (see 308), corresponding to each of the OS processes and each of the remote system calls (see 306).

At 312, verification of the single transaction is performed using the plurality of results from the OLAP system. For example, the ETL processing system 204 may perform verification of the results from the OLAP system 104 (see 310). The single transaction identifier enables better verification control than performing loads sequentially or without using a single overall transaction.

The following sections provide additional details of the ETL processes described herein.

Transactions, Tasks, Dataflows and Processes

The ETL processing system 204 (see FIG. 2) generates a transaction having a single transaction identifier to coordinate the ETL operation. See also 302 in FIG. 3. As further described herein, using the single transaction identifier allows better transaction control for parallel load operations, as compared to verification of multiple, sequential transactions. The transaction may also be referred to as a project, and the transaction identifier may be referred to as a project identifier. The transaction identifier may be a 32-character unique identifier generated by the ETL processing system 204.

A project may contain one or more tasks. In general, a task has one source datastore (e.g., one or more source tables in one of the cloud storage systems 106) and one target datastore (e.g., a target table in the same, or in another of, the cloud storage systems 106).

A task may contain one or more dataflows. Each dataflow has a target table. In general, a dataflow defines the movement and transformation of data from one or more sources to a single target. Within a dataflow, transforms may be used to define the changes to the data that are required by the target. The dataflows may be arranged in the task according to a list, and the dataflows may be executed in sequence based on the order defined in the list at the task level. A single dataflow may have multiple table sources from the same datastore but it may only have a single target table. Dataflows that do not depend on other dataflows (e.g., that are not arranged in a sequence) may be executed in parallel.

A dataflow at run time is converted to a single operating system (OS) process. If dataflows are connected in series, they are executed sequentially. If two or more dataflows are not connected, they may be executed in parallel (e.g., concurrently). Dataflows may also be grouped, for example to execute two dataflows in parallel, followed by a third dataflow following sequentially. When executing parallel data flows, the ETL processing system 204 may coordinate the parallel dataflows, then wait for each of the predecessor dataflows to complete before starting the next sequential step. The number of dataflows may be as large as the number of OS processes supported by the operating system.

Remote System Calls

The ETL processing system 204 (see FIG. 2) uses the remote system calls 206 to configure the ETL operation for the OLAP system 104. See also 306 in FIG. 3. In general, a remote system call occurs when a computer program on one computer system causes a procedure to execute in a different address space (typically, on another computer system), which is coded as if it were a local procedure call, without the programmer explicitly coding the details for the remote interaction. That is, the remote system call calls a function to be executed by a remote system. In the database environment 100 (see FIG. 2), the OLTP system 102 uses the remote system call 206 to call a function to be executed by the OLAP system 104.

The remote system call may be communicated via a hypertext transfer protocol (HTTP) connector. As such, the remote system can be located generally anywhere. Such operation is contrasted with database environments that use other technologies for the load operation, such as Java™ database connectivity (JDBC). JDBC requires the OLTP system and the OLAP system to be in the same landscape and as close as possible to each other for best performance.

In general, the ETL processing system 204 uses remote system calls for each dataflow to perform ETL operations. (All the dataflows in a task are then associated with the single transaction identifier.) A remote system call includes configuration information, including the parameters, for the ETL operation for that dataflow. The parameters may include a unique identifier, a batch size, a remote system call identifier, and a post-processing flag. The unique identifier provides an identifier for the dataflow, e.g. for use in verification or other post-processing activity. The batch size details how the data loads of the ETL operation are to be subdivided; the batch size and batch processing are discussed in more detail below. The remote system call identifier identifies the function to be executed remotely, including any parameters for the function. For example, the parameters may include the source storage, the source table (or tables), the target storage, the target table, etc. The post-processing flag indicates what post-processing or other verification processes are performed; post-processing and verification are discussed in more detail below.

Figure 7:
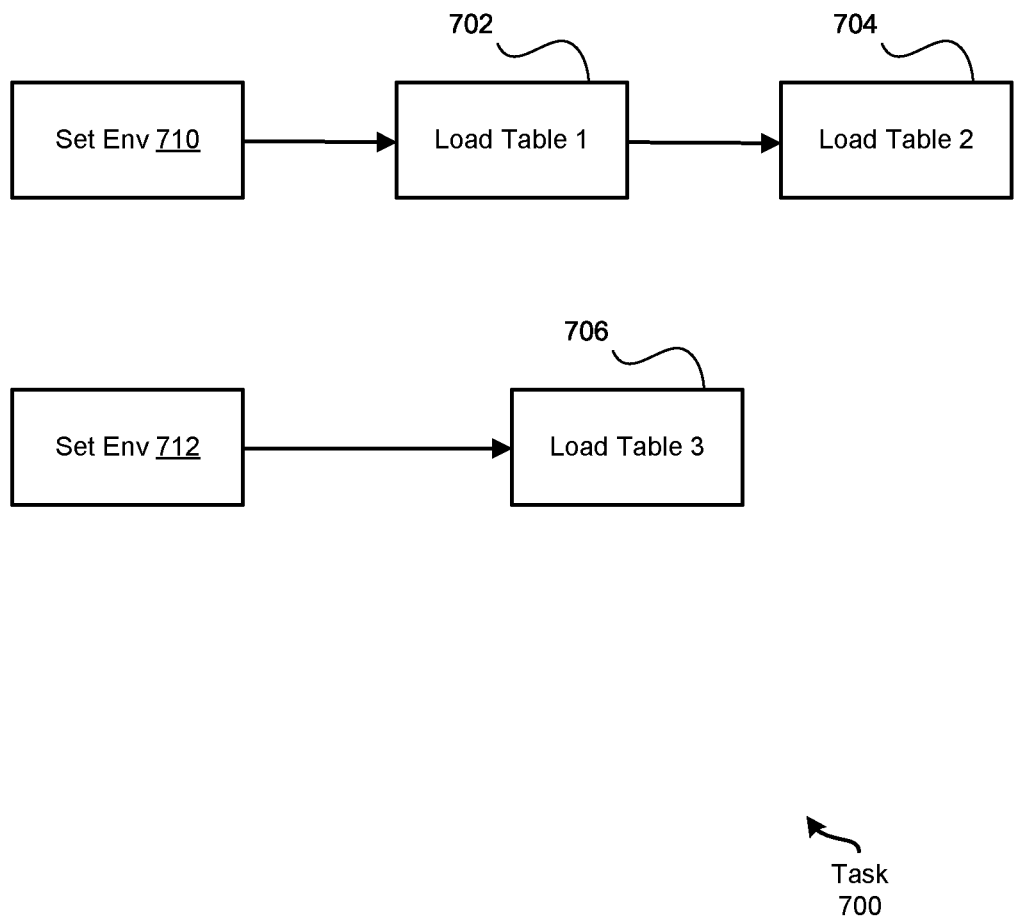
FIG. 7 is a block diagram showing an example of a task 700 that executes three dataflows 702, 704 and 706.

FIG. 7 is a block diagram showing an example of a task 700 that executes three dataflows 702, 704 and 706. The dataflow 702 loads Table 1, the dataflow 704 loads Table 2, and the dataflow 706 loads Table 3. The load of Table 2 is dependent on the load of Table 1, so the dataflows 702 and 704 are linked in sequence. The load of Table 3 is independent of the loads of Tables 1 and 2, so the dataflow 706 is executed in parallel. Each flow is initialized with system environment variables set to desired values using the functions Set Env 710 and Set Env 712.

All three dataflows 702, 704 and 706 share the same transaction identifier in the OLAP system 104, as discussed above. Each dataflow runs as a separate OS process, and each dataflow performs the steps described above using the RFC function names for each step described above (e.g., write data, schedule post-processing, and check post-processing status).

Batch Processing

In general, the batch size instructs the ETL system 204 to divide the ETL load operation (e.g., for a given dataflow) into a number of sub-operations according to the batch size. The batch size may be dynamically calculated based on a row length of a given target table. The batch size may be set in megabytes (e.g., 50 MB), and may be converted into a batch size in records by dividing the batch size (in MB) by the maximum size of the row. (The maximum size of the row is the sum of the maximum sizes for all of the columns in the table.)

As an example, assume the loading batch size in the datastore is set to be 400 Mb, and the dataflow loads a table having four columns with sizes 36, 10, 5000 and 27, making the row size 5073. The loading batch size in records is then the loading batch size in Mb (400,000,000) divides by the row size (5073), resulting in 78848.8, which may be rounded to the nearest 100 records, which is 78,800 records. As a result, if the dataflow is loading 200,000 records into the table, there will be three batches: two batches having 78,800 records and the remaining 42,400 records in the third batch.

Verification and Post-Processing

The ETL processing system 204 may perform verification and post-processing of the transaction at various levels. For example, the ETL processing system 204 may verify the success of the overall transaction, of each task in the transaction, of each dataflow in a given transaction, of each batch in a given dataflow, etc. The level of verification to be performed may be set for a given transaction and may be communicated to the OLAP system 104 via the configuration information in each remote system call. Performing verification of the overall transaction, including performing any necessary rollbacks and retries, allows easier verification of the data commit than coordinating multiple, separate transactions without a single transaction identifier.

According to an embodiment, the ETL processing system 204 performs post-processing on one or more levels. For example, post processing may be performed at the dataflow level, at the transaction level, etc. The post-processing level may be set using the configuration information for each remote system call, for example by using one or more flags. The verification may include an overall status for the single target system transaction in the OLAP system (e.g., the overall transaction is either committed or rolled back).

FIG. 4 is a table 400 showing six different post-processing scenarios, according to an embodiment. The ETL processing system 204 implementing the post-processing scenarios of table 400 may perform post-processing at the dataflow level and at the transaction level. The post-processing occurs in response to receiving a result of the ETL operation performed by the OLAP system 104, as instructed according to the remote system call 206. The result (D, RD, RE or E) depends on the status reported by the OLAP system 104 and on the "treat error as success" flag.

In scenario 1, the OLAP system 104 reports the status of "processed" and the flag to treat errors as success is "true". As a result, the ETL processing system 204 treats the result as success ("D"). The ETL processing system 204 continues processing the subsequent dataflows regardless of whether the post-processing is performed at the dataflow level or at the transaction level.

In scenario 2, the OLAP system 104 reports the status of "processed" and the flag to treat errors as success is "false". The operation is otherwise the same as in scenario 1.

In scenario 3, the OLAP system 104 reports the status of "processed with errors" and the flag to treat errors as success is "true". As a result, the ETL processing system 204 treats the result as success with error ("RD"), also referred to as a warning. The operation is otherwise the same as in scenarios 1-2.

In scenario 4, the OLAP system 104 reports the status of "processed with errors" and the flag to treat errors as success is "false". As a result, the ETL processing system 204 treats the result as either failure with warning ("RE") or error ("E"), depending upon the post-processing level.

If the post-processing is performed at the dataflow level, the result is "E" and the sequence of dataflows is stopped. This is because the dataflow has an error and the treat errors as success flag is "false", so the subsequent dataflows will not be executed.

If the post-processing is performed at the transaction level, the result is "RE" and the data loading to staging from all dataflows will be completed first, before triggering all the post-processing at the same time. If one of the post-processing results is returned as "processed with errors", the overall transaction is marked as "RE" and the subsequent dataflows will continue, because all the post-processing is performed together at the end in sequence.

In scenario 5, the OLAP system 104 reports the status of "error" and the flag to treat errors as success is "true". As a result, the ETL processing system 204 treats the result as an error and stops subsequent processing, both at the dataflow level and at the transaction level. The OLAP system 104 also performs a rollback.

In scenario 6, the OLAP system 104 reports the status of "error" and the flag to treat errors as success is "false". The operation is otherwise the same as in scenario 5.

As discussed above, dataflows may be executed in parallel when they have not been orchestrated to operate in sequence. In addition, dataflows may be grouped to execute in parallel within a sequence. In such a case, all the dataflows that run in parallel will continue to run when one of them is stopped (e.g., in scenario 4 above), but the subsequent dataflows will not run. For example, consider the following transaction:

DF1 -> Group (DF2 -> DF2a, DF3 -> DF3a) -> DF4

In the above, dataflows DF2 and DF3 may be executed in parallel, as members of the group. If DF2 is stopped due to a post-processing error, DF3 and DF3a will continue, but DF4 will be stopped and will not run.

As a result of the embodiments described herein, loading and post-processing are performed by different processes, allowing to load data to different tables on separate CPUs or even separate computers, but still be linked together and post processed as a single transaction based on the same id. The customers are getting the benefits of faster processing and easier monitoring.

Figure 5:
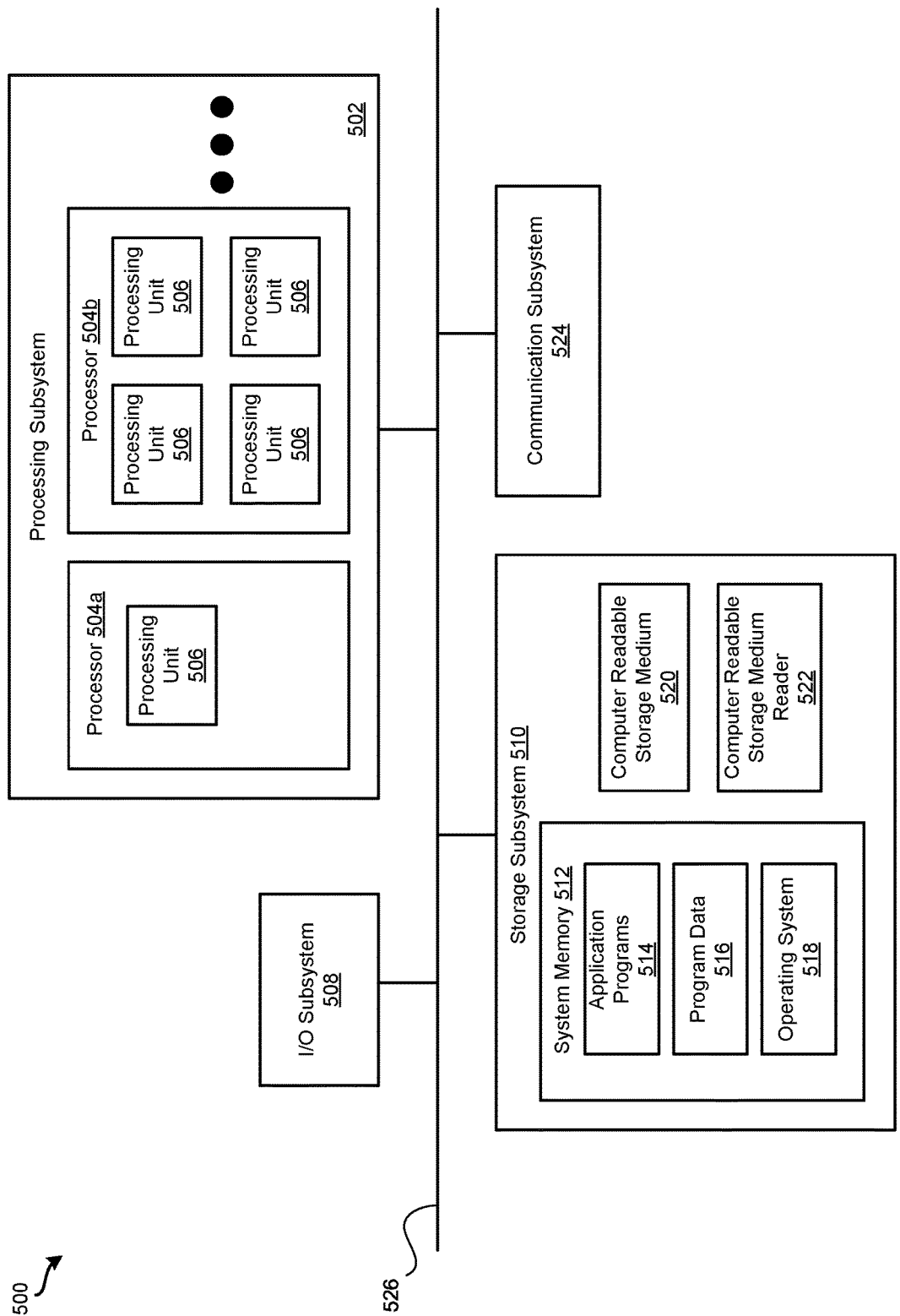
FIG. 5 is a block diagram of an example computer system 500 for implementing various embodiments described above.

FIG. 5 is a block diagram of an example computer system 500 for implementing various embodiments described above. For example, the computer system 500 may be used to implement the OLTP system 102, the OLAP system 104, the cloud storage systems 106, other devices that access the database environment 100 (see FIG. 1), etc. The computer system 500 may be a desktop computer, a laptop, a server computer, or any other type of computer system or combination thereof. Some or all elements of the transaction processing system 202, the ETL processing system 204 (see FIG. 2), or combinations thereof can be included or implemented in the computer system 500. In addition, the computer system 500 can implement many of the operations, methods, and/or processes described above (e.g., the method 300 of FIG. 3, etc.). As shown in FIG. 5, the computer system 500 includes a processing subsystem 502, which communicates, via a bus subsystem 526, with an input/output (I/O) subsystem 508, a storage subsystem 510 and a communication subsystem 524.

The bus subsystem 526 is configured to facilitate communication among the various components and subsystems of the computer system 500. While the bus subsystem 526 is illustrated in FIG. 5 as a single bus, one of ordinary skill in the art will understand that the bus subsystem 526 may be implemented as multiple buses. The bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

The processing subsystem 502, which can be implemented as one or more integrated circuits (e.g., a conventional microprocessor or microcontroller), controls the operation of the computer system 500. The processing subsystem 502 may include one or more processors 504. Each processor 504 may include one processing unit 506 (e.g., a single core processor such as the processor 504a) or several processing units 506 (e.g., a multicore processor such as the processor 504b). In some embodiments, the processors 504 of the processing subsystem 502 may be implemented as independent processors while, in other embodiments, the processors 504 of the processing subsystem 502 may be implemented as multiple processors integrate into a single chip or multiple chips. Still, in some embodiments, the processors 504 of the processing subsystem 502 may be implemented as a combination of independent processors and multiple processors integrated into a single chip or multiple chips.

In some embodiments, the processing subsystem 502 may execute a variety of programs or processes in response to program code and can maintain multiple concurrently executing programs or processes. At any given time, some or all of the program code to be executed may reside in the processing subsystem 502 or in the storage subsystem 510. Through suitable programming, the processing subsystem 502 may provide various functionalities, such as the functionalities described above by reference to the method 300 (see FIG. 3), etc.

The I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, or other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, or other types of devices and mechanisms for outputting information from the computer system 500 to a user or another device (e.g., a printer).

As illustrated in FIG. 5, the storage subsystem 510 includes a system memory 512, a computer-readable storage medium 520, and a computer-readable storage medium reader 522. The storage subsystem 510 may implement the storage performed by the cloud storage systems 106 (see FIG. 1). The system memory 512 may be configured to store software in the form of program instructions that are loadable and executable by the processing subsystem 502 as well as data generated during the execution of program instructions. In some embodiments, the system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). The system memory 512 may include different types of memory, such as static random access memory (SRAM) and/or dynamic random access memory (DRAM). The system memory 512 may include a basic input/output system (BIOS), in some embodiments, that is configured to store basic routines to facilitate transferring information between elements within the computer system 500 (e.g., during start-up). Such a BIOS may be stored in ROM (e.g., a ROM chip), flash memory, or another type of memory that may be configured to store the BIOS.

As shown in FIG. 5, the system memory 512 includes application programs 514 (e.g., that implement the ETL processing system 204 of FIG. 2), program data 516, and operating system (OS) 518. The OS 518 may be one of various versions of Microsoft Windows™, Apple Mac OS™, Apple OS X™, Apple macOS™, and/or Linux™ operating systems, a variety of commercially-available UNIX™ or UNIX-like operating systems (including without limitation the variety of GNU/Linux operating systems, the Google Chrome™ OS, and the like) and/or mobile operating systems such as Apple iOS™, Windows Phone™, Windows Mobile™, Android™, BlackBerry OS™, Blackberry 10™, Palm OS™, and WebOS™ operating systems.

The computer-readable storage medium 520 may be a non-transitory computer-readable medium configured to store software (e.g., programs, code modules, data constructs, instructions, etc.). Many of the components (e.g., the ETL processing system 204 of FIG. 2, etc.) or processes (e.g., the method 300 of FIG. 3, etc.) described above may be implemented as software that when executed by a processor or processing unit (e.g., a processor or processing unit of the processing subsystem 502) performs the operations of such components and/or processes. The storage subsystem 510 may also store data used for, or generated during, the execution of the software.

The storage subsystem 510 may also include the computer-readable storage medium reader 522 that is configured to communicate with the computer-readable storage medium 520. Together and, optionally, in combination with the system memory 512, the computer-readable storage medium 520 may comprehensively represent remote, local, fixed, and/or removable storage devices plus storage media for temporarily and/or more permanently containing, storing, transmitting, and retrieving computer-readable information.

The computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or other types of computer-readable storage media or device.

The communication subsystem 524 serves as an interface for receiving data from, and transmitting data to, other devices, computer systems, and networks. For example, the communication subsystem 524 may allow the computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). The communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth™, ZigBee™, etc., or any combination thereof), global positioning system (GPS) receiver components, or other components. In some embodiments, the communication subsystem 524 may provide components configured for wired communication (e.g., Ethernet) in addition to or instead of components configured for wireless communication.

One of ordinary skill in the art will realize that the architecture shown in FIG. 5 is only an example architecture of the computer system 500, and that the computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
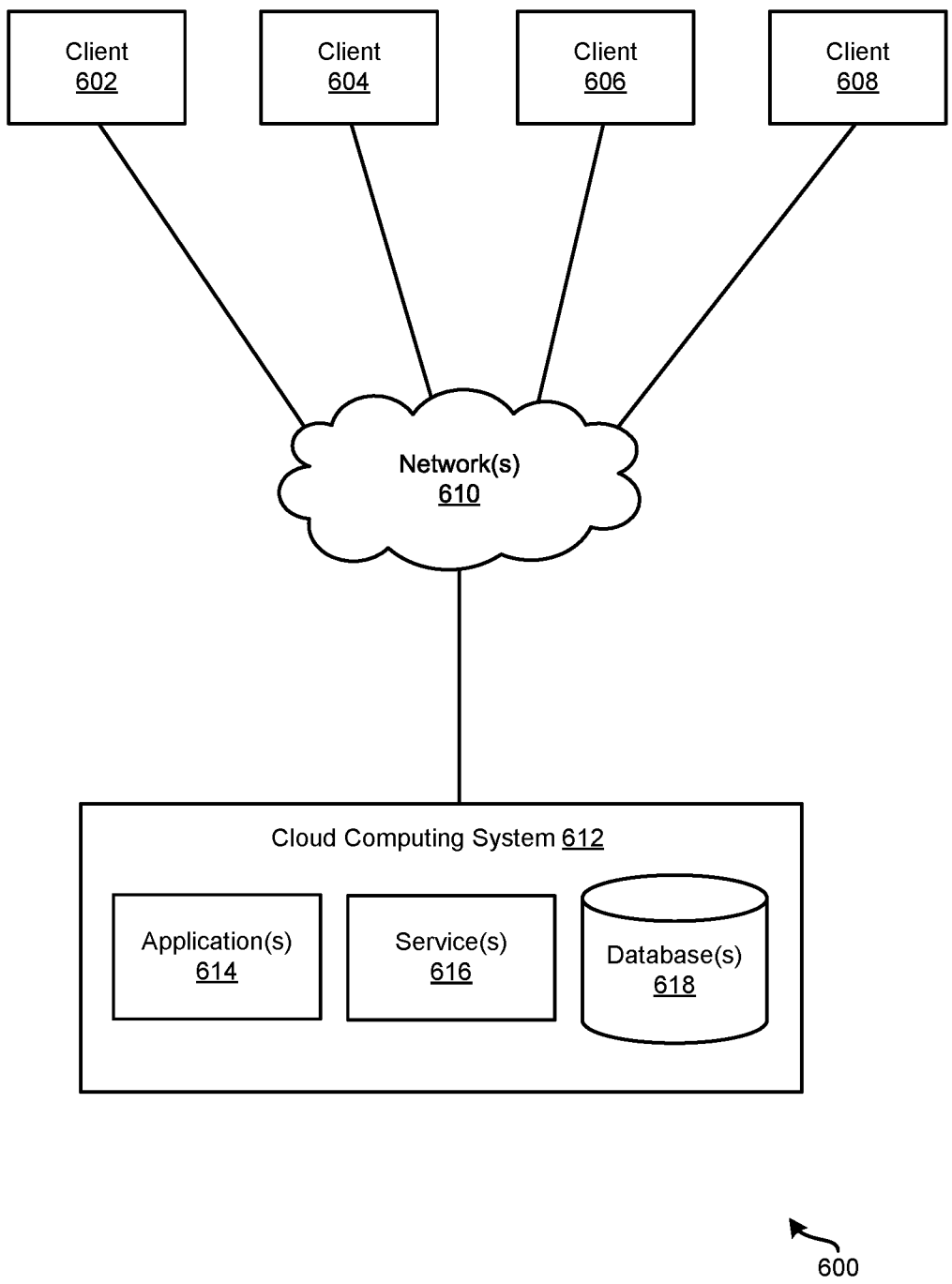
FIG. 6 is a block diagram of a cloud computing system 600 for implementing various embodiments described above.

FIG. 6 is a block diagram of a cloud computing system 600 for implementing various embodiments described above. For example, one of the client devices 602-608 may be used to implement a client device for accessing the database environment 100 (see FIG. 1), and a cloud computing system 612 of the system 600 may be used to implement the OLTP system 102, the OLAP system 104, the cloud storage systems 106, the ETL system 204, etc. As shown, the system 600 includes the client devices 602-608, one or more networks 610, and the cloud computing system 612. The cloud computing system 612 is configured to provide resources and data to the client devices 602-608 via the networks 610. In some embodiments, the cloud computing system 600 provides resources to any number of different users (e.g., customers, tenants, organizations, etc.). The cloud computing system 612 may be implemented by one or more computer systems (e.g., servers), virtual machines operating on a computer system, or a combination thereof.

As shown, the cloud computing system 612 includes one or more applications 614, one or more services 616, and one or more databases 618. The cloud computing system 600 may provide the applications 614, services 616, and databases 618 to any number of different customers in a self-service, subscription-based, elastically scalable, reliable, highly available, and secure manner.

In some embodiments, the cloud computing system 600 may be adapted to automatically provision, manage, and track a customer's subscriptions to services offered by the cloud computing system 600. The cloud computing system 600 may provide cloud services via different deployment models. For example, cloud services may be provided under a public cloud model in which the cloud computing system 600 is owned by an organization selling cloud services and the cloud services are made available to the general public or different industry enterprises. As another example, cloud services may be provided under a private cloud model in which the cloud computing system 600 is operated solely for a single organization and may provide cloud services for one or more entities within the organization. The cloud services may also be provided under a community cloud model in which the cloud computing system 600 and the cloud services provided by the cloud computing system 600 are shared by several organizations in a related community. The cloud services may also be provided under a hybrid cloud model, which is a combination of two or more of the aforementioned different models.

In some instances, any one of the applications 614, services 616, and databases 618 made available to the client devices 602-608 via the networks 610 from the cloud computing system 600 is referred to as a "cloud service". Typically, servers and systems that make up the cloud computing system 600 are different from the on-premises servers and systems of a customer. For example, the cloud computing system 600 may host an application and a user of one of client devices 602-608 may order and use the application via the networks 610.

The applications 614 may include software applications that are configured to execute on the cloud computing system 612 (e.g., a computer system or a virtual machine operating on a computer system) and be accessed, controlled, managed, etc. via the client devices 602-608. In some embodiments, the applications 614 may include server applications and/or mid-tier applications (e.g., HTTP (hypertext transport protocol) server applications, FTP (file transfer protocol) server applications, CGI (common gateway interface) server applications, Java™ server applications, etc.). The services 616 are software components, modules, application, etc. that are configured to execute on the cloud computing system 612 and provide functionalities to the client devices 602-608 via the networks 610. The services 616 may be web-based services or on-demand cloud services.

The databases 618 are configured to store and/or manage data that is accessed by the applications 614, the services 616, or the client devices 602-608. For instance, the transactional data processed by the OLTP system 102, the analytic data processed by the OLAP system 104, the data stored by the cloud storage systems 106 (see FIG. 1), etc. may be stored in the databases 618. The databases 618 may reside on a non-transitory storage medium local to (and/or resident in) the cloud computing system 612, in a storage-area network (SAN), or on a non-transitory storage medium local located remotely from the cloud computing system 612. In some embodiments, the databases 618 may relational databases that are managed by a relational database management system (RDBMS), etc. The databases 618 may be a column-oriented databases, row-oriented databases, or a combination thereof. In some embodiments, some or all of the databases 618 are in-memory databases. That is, in some such embodiments, data for the databases 618 are stored and managed in memory (e.g., random access memory (RAM)).

The client devices 602-608 are configured to execute and operate a client application (e.g., a web browser, a proprietary client application, etc.) that communicates with the applications 614, services 1716, or databases 618 via the networks 610. This way, the client devices 602-608 may access the various functionalities provided by the applications 614, services 616, and databases 618 while the applications 614, services 616, and databases 618 are operating (e.g., hosted) on the cloud computing system 600. The client devices 602-608 may be the computer system 500 (see FIG. 5). Although the system 600 is shown with four client devices, any number of client devices may be supported.

The networks 610 may be any type of network configured to facilitate data communications among the client devices 602-608 and the cloud computing system 612 using any of a variety of network protocols. The networks 610 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method of data processing, the method comprising:

generating, by an extract, transform, load (ETL) system, a single target system transaction having a single transaction identifier as part of performing an ETL operation;

generating, by the ETL system, a plurality of operating system (OS) processes, wherein the plurality of OS processes corresponds to a plurality of load operations of the ETL operation, wherein each of the plurality of load operations is associated with one target table of a plurality of target tables;

executing in parallel, by the ETL system, the plurality of OS processes, wherein each of the plurality of OS processes is associated with the single transaction identifier;

loading, by an online analytic processing (OLAP) system, each of the plurality of target tables according to configuration information for each of the plurality of load operations as a part of the single target system transaction in the OLAP system; and communicating, by the OLAP system to the ETL system, a plurality of results of loading the plurality of target tables.

2. The method of claim 1, wherein the configuration information is received from the ETL system.

3. The method of claim 1, wherein the single transaction identifier is associated with the configuration information.

4. The method of claim 1, wherein the single transaction identifier allows better transaction control for parallel load operations, as compared to verification of multiple, sequential transactions.

5. The method of claim 1, wherein the single transaction includes a plurality of dataflows, wherein the plurality of dataflows is associated with the single transaction identifier.

6. The method of claim 1, wherein the configuration information for a given load operation of the plurality of load operations includes a unique identifier, a batch size, a remote system call identifier, and a post-processing flag.

7. The method of claim 1, wherein the ETL system communicates the configuration information to the OLAP system using a plurality of remote system calls, wherein each of the plurality of remote system calls corresponds to one of the plurality of OS processes, to one of the plurality of load operations, and to one target table of the plurality of target tables.

8. The method of claim 1, wherein the configuration information for each of the plurality of load operations includes a batch size, wherein the ETL system divides a given load operation of the plurality of load operations into a number of batches according to the batch size.

9. The method of claim 8, wherein the batch size is dynamically calculated based on a row length of a given target table of the plurality of target tables, wherein the given table is specified in the configuration information of the given load operation.

10. The method of claim 1, further comprising:

performing verification, by the ETL system, of the single target system transaction using the plurality of results from the OLAP system, wherein the single transaction includes a plurality of dataflows, wherein verification of the single target system transaction is performed on at least one of a transaction level and a dataflow level.

11. The method of claim 1, wherein the single transaction contains a plurality of tasks, wherein a given task of the plurality of tasks includes a plurality of dataflows.

12. The method of claim 1, wherein a given OS process of the plurality of OS processes contains a plurality of dataflows, wherein a first set of the plurality of dataflows are executed in parallel and a second set of the plurality of dataflows are executed sequentially.

13. The method of claim 1, wherein the OLAP system includes an in-memory database system.

14. A non-transitory computer readable medium storing instructions that, when executed by a processor of a computer system, control the computer system to perform a method of data processing, the method comprising:
   generating, by an extract, transform, load (ETL) system, a single target system transaction having a single transaction identifier as part of performing an ETL operation;
   generating, by the ETL system, a plurality of operating system (OS) processes, wherein the plurality of OS processes corresponds to a plurality of load operations of the ETL operation, wherein each of the plurality of load operations is associated with one target table of a plurality of target tables;
   executing in parallel, by the ETL system, the plurality of OS processes, wherein each of the plurality of OS processes is associated with the single transaction identifier;
   loading, by an online analytic processing (OLAP) system, each of the plurality of target tables according to configuration information for each of the plurality of load operations as a part of the single target system transaction in the OLAP system; and
   communicating, by the OLAP system to the ETL system, a plurality of results of loading the plurality of target tables.

15. A computer system for performing data processing, the computer system comprising:
   an extract, transform, load (ETL) system, wherein the ETL system comprises a processor and a memory; and
   an online analytic processing (OLAP) system, wherein the OLAP system comprises a processor and a memory,
   wherein the ETL system is configured to generate a single target system transaction having a single transaction identifier as part of performing an ETL operation,
   wherein the ETL system is configured to generate a plurality of operating system (OS) processes, wherein the plurality of OS processes corresponds to a plurality of load operations of the ETL operation, wherein each of the plurality of load operations is associated with one target table of a plurality of target tables,
   wherein the ETL system is configured to execute in parallel the plurality of OS processes, wherein each of the plurality of OS processes is associated with the single transaction identifier,
   wherein the OLAP system is configured to load each of the plurality of target tables according to configuration information for each of the plurality of load operations as a part of the single target system transaction in the OLAP system, and
   wherein the OLAP system is configured to communicate, to the ETL system, a plurality of results of loading the plurality of target tables.

16. The computer system of claim 15, wherein the configuration information is received from the ETL system.

17. The computer system of claim 15, wherein the single transaction identifier is associated with the configuration information.

18. The computer system of claim 15, wherein the single transaction identifier allows better transaction control for parallel load operations, as compared to verification of multiple, sequential transactions.

19. The computer system of claim 15, wherein the single transaction includes a plurality of dataflows, wherein the plurality of dataflows is associated with the single transaction identifier.

20. The computer system of claim 15, wherein the configuration information for each of the plurality of load operations includes a batch size, wherein the ETL system divides a given load operation of the plurality of load operations into a number of batches according to the batch size.

* * * * *